United States Patent [19]
Campbell et al.

[11] Patent Number: 6,066,809
[45] Date of Patent: May 23, 2000

[54] WEIGHING MATERIAL ON A CONVEYOR

[75] Inventors: Ronald H. Campbell, Mendon, Utah; Paul W. Dow, Byron; Allen E. Russell, Attica, both of N.Y.

[73] Assignee: HarvestMaster, Inc., Logan, Utah

[21] Appl. No.: 09/348,426

[22] Filed: Jul. 7, 1999

Related U.S. Application Data

[63] Continuation of application No. 09/060,528, Apr. 15, 1998, Pat. No. 5,959,257.

[51] Int. Cl.[7] .......................... G01G 11/14; G01G 19/40; G01G 13/02; G01G 19/08
[52] U.S. Cl. .................. 177/16; 177/25.19; 177/119; 177/136; 177/145; 701/50
[58] Field of Search .................. 177/16, 25.19, 177/119, 120, 121, 136, 139, 141, 145; 701/50, 207, 208, 209, 210, 213; 702/174, 175; 222/55, 56; 141/83

[56] References Cited

U.S. PATENT DOCUMENTS

| | | | |
|---|---|---|---|
| 2,279,041 | 4/1942 | Hadley | 265/5 |
| 2,659,564 | 11/1953 | Gibson | 249/58 |
| 2,882,036 | 4/1959 | Lyons | 265/28 |
| 2,939,569 | 6/1960 | Roach et al. | 198/37 |
| 3,722,660 | 3/1973 | Snead | 198/39 |
| 3,736,997 | 6/1973 | Bottorf | 177/145 |
| 3,944,050 | 3/1976 | Kane | 198/37 |
| 4,122,940 | 10/1978 | Hoffmann | 198/504 |
| 4,627,013 | 12/1986 | Ichiyama et al. | 177/136 |
| 4,682,664 | 7/1987 | Kemp | 177/16 |
| 4,729,442 | 3/1988 | Sichet | 177/50 |
| 4,788,930 | 12/1988 | Matteau et al. | 177/16 |
| 5,178,226 | 1/1993 | Bowman et al. | 177/139 |
| 5,219,031 | 6/1993 | Brandt, Jr. | 177/145 |
| 5,384,436 | 1/1995 | Pritchard | 177/136 |
| 5,423,456 | 6/1995 | Arenddonk et al. | 222/54 |
| 5,717,167 | 2/1998 | Filing et al. | 177/136 |
| 5,870,686 | 2/1999 | Monson | 701/50 |
| 5,938,709 | 8/1999 | Hale et al. | 701/50 |
| 5,955,973 | 9/1999 | Anderson | 701/50 |
| 5,959,257 | 9/1999 | Campbell et al. | 177/16 |
| 5,964,298 | 10/1999 | Greenspun | 701/50 |

*Primary Examiner*—Randy W. Gibson
*Attorney, Agent, or Firm*—R. Burns Israelson; Workman, Nydegger & Seeley

[57] ABSTRACT

A weighing system for measuring the weight of a material carried on a conveyor assembly. The weighing system is compatible with conveyor assemblies wherein either the pitch angle, the roll angle, or both, is variable. The weighing system includes a load cell that measures a force borne by the support member of the conveyor assembly. One or more clinometers are used to define the angular position of the conveyor assembly. The number of clinometers is great enough to fully define the pitch angle, the roll angle, and the direction through which the measured force acts. The measured angles, the measured force, and a tare weight of the conveyor are used to calculate the weight of the material. The weighing system may be adapted to measure a flow rate of the material. Furthermore, the conveyor assembly may be mounted on harvesting equipment in order to measure crop yield data and to generate maps depicting the crop yield distribution over a field.

28 Claims, 5 Drawing Sheets

WEIGHING MATERIAL ON A CONVEYOR

RELATED APPLICATION

This application is a continuation of U.S. patent application Ser. No. 09/060,528, entitled "System For Weighing Material on a Conveyor," filed Apr. 15, 1998, now U.S. Pat. No. 5,959,257 which is incorporated herein by reference.

BACKGROUND OF THE INVENTION

1. The Field of the Invention

The present invention relates to weighing systems for measuring the weight of a material carried on a conveyor. In particular, the present invention relates to systems for weighing material carried on a conveyor assembly, wherein the one or both of the pitch angle and the roll angle of the conveyor assembly is variable relative to the horizontal plane.

2. The Prior State of the Art

Conveyors are widely used in industry in order to transport material from one location to another. Conveyors are often used to transport material in manufacturing, construction, and agricultural applications, to name just a few. There are a wide variety of conveyors, including continuous belt devices that carry material and augers that move material using the rotary action of a helical member. Frequently, conveyors are used in processes wherein it is desirable not only to move the material but also to measure the weight of the material.

Over the years, a number of systems for measuring the weight of conveyed material have been developed. One approach involves discharging material from a conveyor onto a scale, whereby the weight of the material is measured. Frequently, it is inconvenient to discharge material onto a scale, since conveyors are often used to make material available at a desired location for uses that are incompatible with the scale. Another method involves positioning the entire conveyor assembly on the platform of a scale in order to measure the combined weight of the conveyor assembly and the material carried thereon. The tare weight of the conveyor assembly is subtracted from the combined weight measurement to determine the weight of the material. This method may significantly restrict the environments in which conveyor assemblies may be used, since the platform of the scale is cumbersome and prevents easy transport of the conveyor assembly. The size and cost of the equipment required in the foregoing methods further limit their practicability.

There have been developed further weighing systems which overcome some of the problems associated with the foregoing methods. For example, one system is based on the observation that the power required to operate a conveyor assembly is related to the weight of the material carried by the conveyor. Accordingly, the system involves monitoring the power consumption of the conveyor assembly and calculating the weight of the material from the measured data. In addition, there are systems that weigh material by using load cells under the conveyor belt or in the support member of the conveyor assembly.

Depending on the configuration of the conveyor assembly and the environment in which it is used, the systems that employ power consumption monitoring or load cells may adequately weigh the conveyed material without significantly interfering with the operation of the conveyor assembly. However, the foregoing systems generally are not suitable for measuring the weight of material on a conveyor having a variable pitch angle. For example, the power required to transport material is a function of the vertical distance through which the material is moved. Varying the pitch of a conveyor changes the power requirements of the conveyor assembly. Consequently, the power consumption of such a conveyor assembly does not uniquely correspond to the weight of the material. The method of monitoring power consumption has also been found to be limited to conveyors having a relatively shallow pitch, in a range from about five degrees above the horizontal to about five degrees below the horizontal. Likewise, the force measurements made by load cells in support members or under conveyor belts change as the pitch of the conveyor assembly changes. Accordingly, load cells have generally been useful only in conveyors that have a fixed pitch.

One approach for overcoming the problems of measuring weight on a conveyor having a variable pitch is presented in U.S. Pat. No. 4,788,930 to Matteau. The pitch of the conveyors taught by Matteau is variable in the sense that the angle between the centerline of the conveyor and the horizontal plane may be changed as desired. Accordingly, conveyors that are compatible with the weighing system of Matteau may have as many as one degree of rotational freedom relative to the horizontal plane. Matteau discloses using a clinometer in combination with a plurality of force sensors that detect the load on a segment of a conveyor belt. The clinometer provides information relating to the pitch of the conveyor, by which the force measurements from the force sensors may be adjusted in order to calculate the weight of the material.

The measurement system of Matteau, while overcoming some of the problems previously associated with measuring weight on a conveyor, has several drawbacks and limitations. For example, the system requires multiple sensors to be positioned under the conveyor belt, thereby increasing the complexity of the conveyor assembly. Moreover, Matteau extends to conveyors having at most one degree of rotational freedom relative to the horizontal plane. An example of such a conveyor assembly is one that is pivotally attached to a fixed base, such as a floor, and that may be pivotally raised and lowered by adjustment of a support member. Furthermore, many types of conveying chains and belts do not lend themselves to having weighing sensors positioned thereunder, regardless of the pitch of the conveyor.

There are a large number of conveyor assembly applications with which the existing weighing systems simply are not compatible. For example, conveyors are often transportable, and may be carried on a truck, harvesting equipment, or another vehicle. In such situations, it is common for the conveyor to be rotated relative to the horizontal plane with two degrees of freedom. In other words, both the pitch angle and the roll angle of such conveyors are freely variable.

Often such conveyors may be further varied by adjusting the support member. Thus, the pitch angle of such conveyors may change according to two mechanisms: unavoidable movement of the transporting vehicle and intentional adjustment of the support member. It can be understood that the angle of inclination with respect to the horizontal plane of such adjustable support members is only partially dependent on the pitch angle. Accordingly, a third independent variable, in addition to the pitch angle and the roll angle, is introduced into some conveyor/support member assemblies.

Examples of conveyor assembles that have variable pitch angles and roll angles are common in agricultural settings wherein crops are harvested using a harvesting vehicle equipped with a conveyor. There are also many other examples, including manufacturing and construction equipment for use with gravel, cement, other bulk materials, and the like. Conventional conveyor assemblies and previously existing weighing systems have not been able to accurately measure the weight of material carried on such variable-attitude conveyor assembles. Instead, costly and inconvenient alternatives have been used, such as weighing the material before or after being conveyed. Occasionally, the only available system has been to make unreliable estimates of the weight of the material flowing on the conveyor.

It can be understood that there is a need in the art for systems for weighing material carried by a conveyor having a variable pitch while avoiding the use of multiple load sensors as has been previously practiced. It would also be an advancement in the art to provide weighing systems that may be used with conveyor assemblies having more than one degree of rotational freedom relative to the horizontal plane, such as those that have variable pitch angles and roll angles. It would be particularly desirable to provide such weighing systems that could also be used with conveyors that are transported by trucks, harvesting equipment, or other vehicles.

SUMMARY AND OBJECTS OF THE INVENTION

The present invention relates to weighing systems for measuring the weight of material carried on a conveyor. The weighing systems may be used with conveyors having a variable pitch angle, regardless of whether the pitch angle may be varied as a result of adjustment of a support member, transport of the conveyor over uneven terrain, or both. Moreover, the weighing systems are compatible with conveyors that have both a variable pitch angle and a variable roll angle.

The angular position of the conveyor assembly is measured by one or more clinometers. In embodiments of conveyor assemblies wherein the pitch angle is variable and the roll angle is substantially fixed, one clinometer is used to provide data that specifies the pitch angle. When both the pitch angle and the roll angle are variable, the weighing system includes two clinometers that provide data used to specify both the pitch angle and the roll angle.

As few as one load cell may be used to detect the forces borne by the conveyor assembly. The load cell may be integrally positioned in a support member that bears part of the weight of both the conveyor and the material carried thereon. In an embodiment of the invention, an additional clinometer is included in the weighing system in order to specify the direction through which the measured force acts. Preferably, this clinometer is positioned in relation to the support member so as to measure the support member's angle of inclination with respect to the horizontal plane.

In general, the weighing systems include a number of clinometers that is sufficient to specify the pitch angle and the roll angle of the conveyor and the angle of inclination of the support member. The minimum number of clinometers required depends on the mechanical relationship between the support member and the conveyor and the mechanical relationship between the entire conveyor/support member assembly and the horizontal plane.

One embodiment of the methods for using the weighing systems of the invention involves first providing a conveyor assembly and disposing material thereon. The material may be continually transported by the conveyor and the total weight of the material on the conveyor may continually change during the weighing procedure. Furthermore, the angular configuration of the conveyor assembly may be continuously or repeatedly varied during the weighing operation.

The method further includes detecting a load in the support member of the conveyor assembly using the load cell. The clinometers also provide the data used to specify the pitch angle and the roll angle of the conveyor and the angle of inclination of the support member. A plurality of low pass, anti-aliasing filters may be used, one per channel, to filter the analog signals generated by the load cell and the clinometers, after which the signals are processed by an analog-to-digital converter.

The resulting digital signals are transmitted to a processor. The processor also accesses other relevant information, which may include data relating to the dimensions of the conveyor assembly and a previously-measured tare weight of the conveyor. Using the foregoing measurements and known data and, assuming the material is uniformly distributed on the conveyor, the processor calculates the weight of the material. If a flow rate of the material is desired, the weighing system further includes a shaft speed sensor attached to a pulley of the conveyor.

The weighing process may be repeated as desired as time progresses, such that variations in the weight of the material may be monitored. The weight measurements may be stored for future reference or may be used in any other desired manner. According to one application for the weighing systems of the invention, weight measurements are taken during a crop harvesting operation. For example, a conveyor assembly may be mounted on harvesting equipment such that the harvested crops are placed on the conveyor. The weighing system may be thereby used to determine the weight of the harvested crops. Furthermore, the yield and the yield distribution of the crops may be calculated, and the yield variations of the crops may be mapped using a global positioning system in combination with the weighing system.

In view of the foregoing, it can be appreciated that the weighing systems of the invention allow material carried on a variable pitch conveyor to be weighed using only one load sensor. The use of multiple clinometers allows the weight of material carried by a conveyor having both a variable pitch angle and a variable roll angle to be calculated. Moreover, the weighing systems are compatible with conveyor assemblies that are transported by trucks, harvesting equipment, or other vehicles.

Additional objects and advantages of the invention will be set forth in the description which follows, and in part will be apparent from the description, or may be learned by the practice of the invention. The objects and advantages of the invention may be realized and obtained by means of the elements, steps, and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
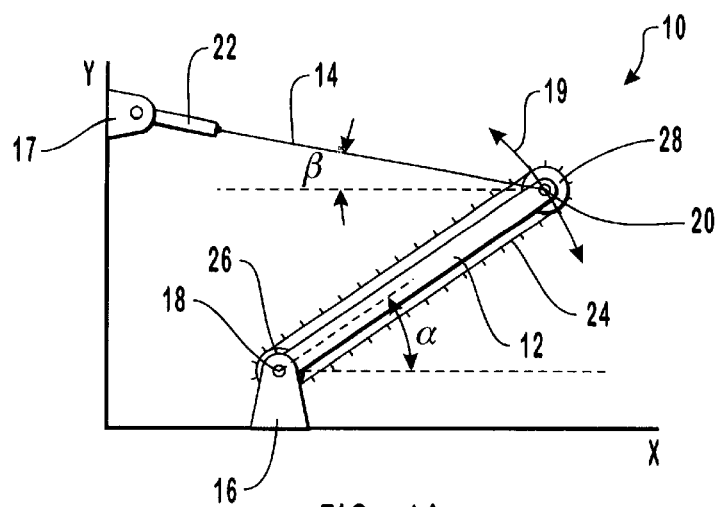
FIG. 1A–1C are elevation views of examples of conveyor assemblies that may be used with the weighing systems of the invention.

The present invention relates to weighing systems for measuring the weight of material carried on a conveyor. The weighing systems may be used with conveyors having a variable pitch angle, regardless of whether the pitch angle may be varied as a result of adjustment of a support member, transport of the conveyor over uneven terrain, or both. Moreover, the weighing systems are compatible with conveyors that have both a variable pitch angle and a variable roll angle.

The weighing operation may be conducted using as few as one load cell integrally positioned on a support member of the conveyor assembly. The weighing system compensates for any variable component of the angular position of the conveyor/support member assembly by using clinometers or other angular position sensors. In general, enough clinometers are used in order to specify the pitch angle and the roll angle of the conveyor and the support member's angle of inclination with respect to the horizontal plane. When one or more of the pitch angle, the roll angle, and the angle of inclination of the support member is fixed or is entirely dependent on one of the other angles, the minimum number of clinometers may be correspondingly reduced. Once the pitch angle, the roll angle, and the angle of inclination of the support member have been measured or otherwise defined, the force measured by the load cell may be used to calculate the weight of the material on the conveyor.

As used herein, the terms "pitch" and "pitch angle" refer to the angular displacement or slope of the centerline of a conveyor from the horizontal plane. The pitch angle is measured about a "pitch axis", which is perpendicular to the centerline of the conveyor and parallel to the horizontal plane. The terms "roll" and "roll angle", as used herein, refer to the angular displacement between the conveyor and the horizontal plane measured about a "roll axis" perpendicular to the pitch axis and parallel to the horizontal plane. Accordingly, the pitch angle and the roll angle of the conveyors are measured about mutually perpendicular axes, each of which is parallel to the horizontal plane.

The pitch angle and the roll angle of a conveyor together uniquely define the "attitude" of the conveyor. The "attitude" of a conveyor refers to the angular position or orientation of the conveyor with respect to the horizontal plane. The yaw, or the rotation about the vertical axis, is generally ignored in describing the position of the conveyors, since the yaw generally does not affect the operation of the weighing systems of the invention. As used herein, the "angle of inclination" of a support member refers to the angle between the longitudinal axis of the support member and the horizontal plane.

Any desired mechanism may be responsible for changing the angular position of the conveyor assemblies relative to the horizontal plane. For example, in some conveyor assemblies, the pitch angle of conveyor may be intentionally raised or lowered by adjusting a support member. Such adjustment of the conveyor results in a conveyor having one degree of rotational freedom relative to the horizontal plane. Other conveyor assemblies may be transported by a vehicle with the result that the entire conveyor assembly rotates according to two degrees of freedom relative to the horizontal plane as the vehicle traverses uneven terrain. Many of the conveyor assemblies that are transported by vehicles further may be intentionally raised and lowered by adjusting the support member such that three independent variables are introduced into the angular position of the conveyor/support member assemblies. In particular, such conveyor/support member assemblies may have variable pitch angles, variable roll angles, and variable angles of inclination of the support members. The conveyor assemblies that may be used with the weighing systems of the invention are not limited to those described above, and may instead have other mechanical relationships between the conveyor, the support member, and the horizontal plane.

The invention is described herein by making primary reference to an embodiment wherein each of the pitch angle, the roll angle, and the angle of inclination of the support member may vary independently. However, it is to be understood that the disclosed examples are presented for illustration purposes, and that the principles taught herein may be applied to weighing systems that are compatible with other conveyor assemblies. Furthermore, the weighing systems can be installed on new conveyor assemblies, while existing conveyor assemblies may be retrofitted with weighing systems as well.

FIG. 1A illustrates one conveyor assembly that may be used with the weighing systems of the invention. Conveyor assembly 10 includes a conveyor 12 and a support member 14 in a pivotal relationship with the conveyor. Conveyor 12 is pivotally attached to a base 16 at a first end 18 and is further connected to support member 14 at a second end 20. The pivotal connection at first end 18 may be accomplished by means of a pin passing through the first end. Conveyor 12 may be selectively raised and lowered as indicated at reference number 19 by adjusting the effective length of support member 14 using a hydraulic ram 22. Support member 14, as illustrated in FIG. 1A, is a cable or chain that bears a tensile force.

The conveyors used with the weighing systems of the invention may be any structure for carrying, pushing, or otherwise transporting or guiding material from along the structure. For example, conveyor 12 in FIG. 1A is an endless belt-type conveyor having a belt 24 that is moved by a first pulley 26 and a second pulley 28. Such conveyors are well known in the art. Alternatively, belt 16 may be a drag-chain for carrying material. Another example of a conveyor that may be used with the weighing systems of the invention is an auger assembly that pushes material by rotation of a helical member.

Figure 1B:
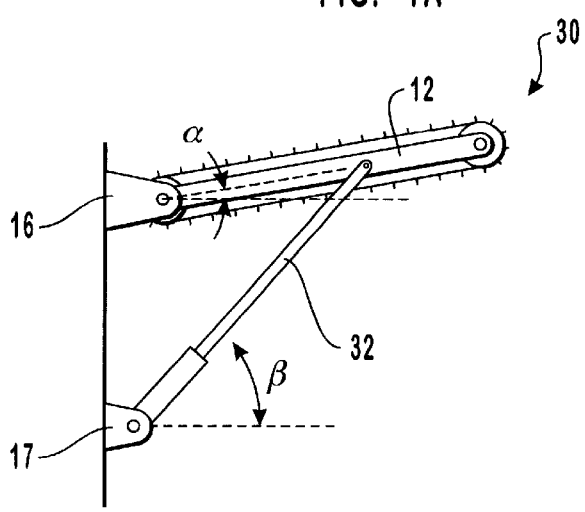
Figure 1C:
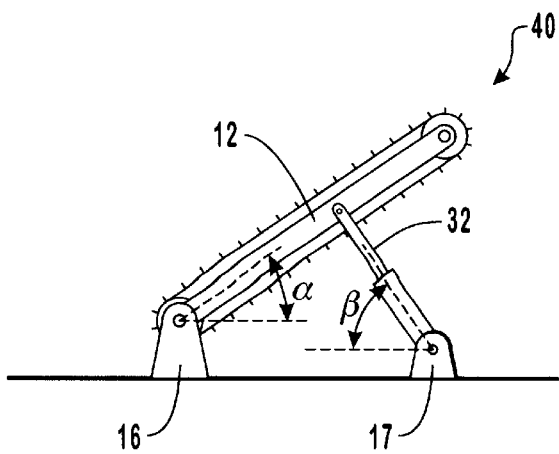

FIG. 1B is an alternative example of a conveyor assembly that may be used with the invention. Conveyor assembly 30 includes a conveyor 12 and a telescoping support member 32 that supports the conveyor under a compressive force. Conveyor 12 may be raised or lowered by adjusting the effective length of support member 32. Likewise, conveyor assembly 40 of FIG. 1C is a further example of a conveyor assembly that may be used with the invention, and also has a conveyor 12 connected to a support member 32. It should be understood that the invention is not limited to the conveyor assemblies of FIGS. 1A–1C, and that a wide variety of other conveyor assemblies may be used in conjunction with the weighing systems of the invention.

The conveyor assemblies illustrated in FIGS. 1A–1C are configured such that the pitch angle may be varied by selectively adjusting the support member. Likewise, the support members' angle of inclination with respect to the horizontal plane is variable in conveyor assemblies 10, 30, and 40.

Figure 2:
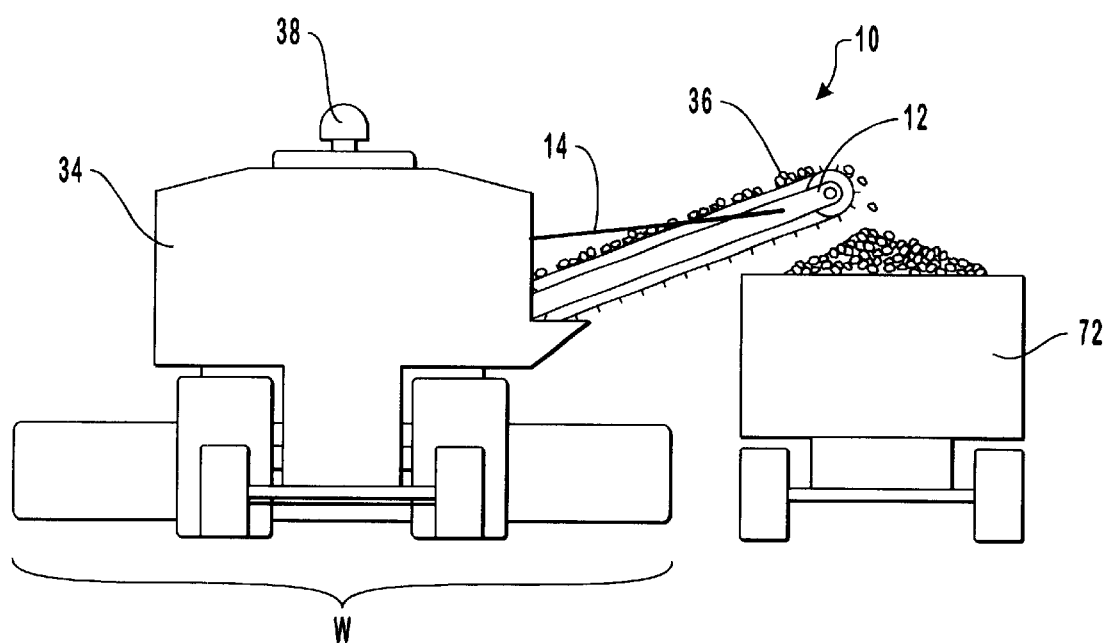
FIG. 2 illustrates an example of an environment in which conveyor assemblies and weighing systems of the invention may be used.

As illustrated in FIG. 2, the conveyor assemblies for use with the invention may be transported on a vehicle so that the pitch angle and the roll angle are variable. FIG. 2 presents one example of an environment in which conveyor assemblies and associated weighing systems may be used. In particular, conveyor assembly 10 is mounted on harvesting equipment 34 for use during a harvesting operation. Harvesting equipment 34 is one example of harvesting means for gathering crops and disposing the crops on the conveyor assembly. It has been found that conveyor assembly 10 may be advantageously used to harvest ear corn, for example. Furthermore, conveyor assembly 30 of FIG. 1B may be advantageously used to harvest grapes.

Harvesting equipment 34 gathers crops growing within a swath having a width, W, as the harvesting equipment is driven across a field, and the crops 36 are disposed on conveyor 12. As seen in FIG. 2, harvesting equipment optionally includes a global positioning system receiver 38, and a conventional vehicle speed sensor (not shown) the purpose of which is discussed in greater detail below. During the harvesting operation, harvesting equipment 34 typically encounters uneven terrain, with the result that the pitch angle and the roll angle of conveyor 12 repeatedly change. Accordingly, conveyor 12 has two degrees of rotational freedom with respect to the horizontal plane. Moreover, the angle of inclination of support member 14 is not completely dependent on the attitude of conveyor 12, since the pitch angle of the conveyor may vary as a result of the action of the support member, the uneven terrain encountered by the harvesting equipment, or both.

Figure 3A:
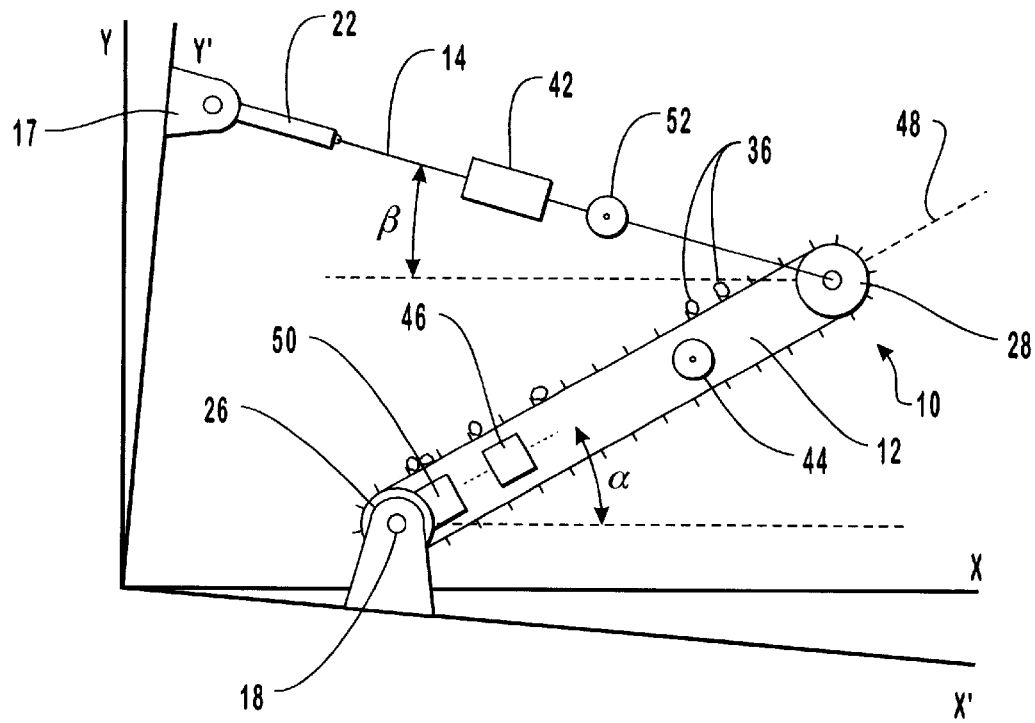
FIG. 3A is an elevation view of the conveyor assembly of FIG. 1A, further depicting selected elements of the weighing system and illustrating a variable pitch angle of the conveyor assembly.
Figure 3B:
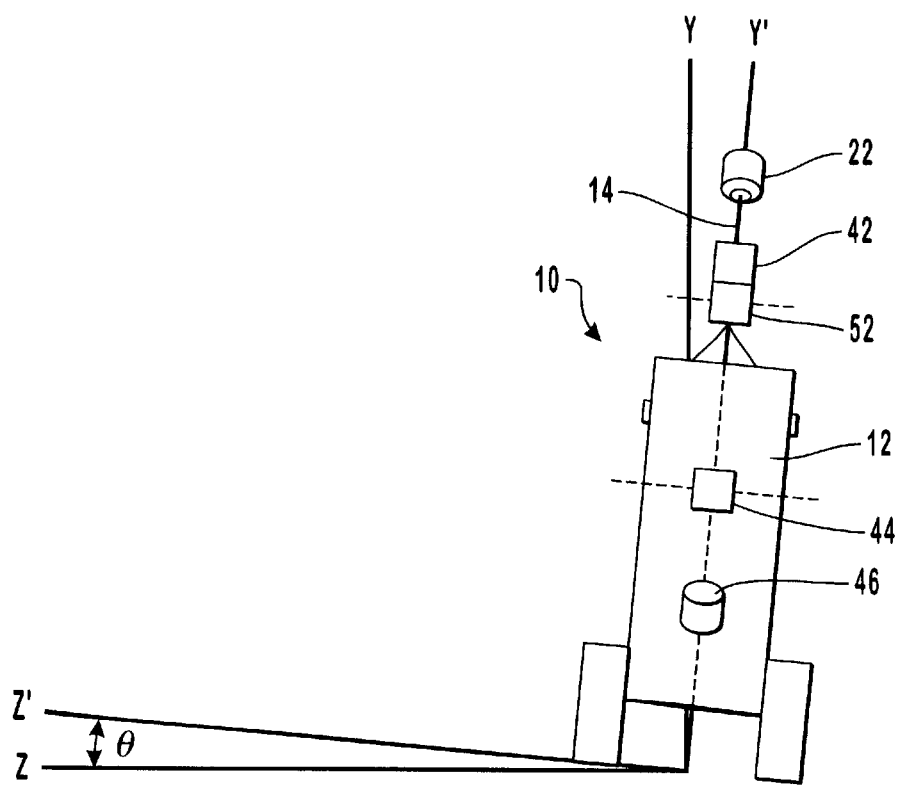
FIG. 3B is an end view of a the conveyor assembly of FIG. 3A, illustrating a variable roll angle of the conveyor assembly.

FIGS. 3A and 3B further illustrate the rotational motion experienced by conveyor assembly 10 and the weighing system used to calculate the weight of the material carried thereon. FIGS. 3A and 3B include two coordinate reference frames by which the rotational motion of the conveyor assemblies may be understood. The XYZ reference frame is defined herein to be fixed with respect to the horizontal plane. Accordingly, both the X axis and the Y axis are horizontal and the Z axis is vertical. In contrast, the X'Y'Z' reference frame is defined to be fixed with respect to the conveyor assembly. In other words, rotation of the conveyor assembly is accompanied by corresponding rotation of the X'Y'Z' reference frame.

Conveyor assembly 10 of FIG. 3A has undergone rotation whereby the X' axis has been displaced from the X axis. This motion has the effect of changing the pitch angle, of conveyor 12, since is measured with respect to the horizontal plane. Moreover, FIG. 3B illustrates rotation of conveyor assembly 10 in which the roll angle of conveyor 12 has been changed. It is also noted that the "pitch axis" about which the pitch angle has been measured in FIG. 3A is parallel to the Z axis and that the "roll axis" about which the roll angle has been measured in FIG. 3B is parallel to the X axis.

The XYZ and X'Y'Z' reference frames are presented herein as but one of many possible manners of describing the relative motion of the elements of the conveyor assemblies of the invention. Thus, the foregoing reference frames are not intended to limit the scope of the invention, which could be equally well described according to other reference frames.

The weighing system for use with conveyor assembly 10 includes a load cell 42 positioned in support member 14 in order to detect the force borne by the support member. Load cell 42 may be any suitable device for detecting a load and outputting an electrical signal that corresponds to the detected load, and is therefore one example of means for sensing a force borne by the support member. One example of the many suitable load cells that may be used with the invention is load cell model #RSC manufactured by HBM, Inc., of Framingham, Mass. Load cell 42 may be positioned at support member 14 at any location where the force borne by the support member may be measured. For example, load cell 42 may be disposed at some point in the length of support member 14 as shown in FIG. 1A, or instead may be located at one of the ends of the support member. The weighing system may also include an overload protection system, whereby the load cell is prevented from sensing extreme forces that may be experienced during the dynamic movement of the conveyor assembly.

The load cell may be aligned with the longitudinal axis of the support member in order to measure a force acting in a direction parallel to the support member. Such an alignment of load cell 42 is illustrated in FIG. 3A. However, the load cell may instead be aligned in other selected directions so as to detect a force acting in a direction that is non-parallel to the support member. For example, a force sensor may be positioned at the junction between the support member and the conveyor so as to measure a force in a direction tangent to the rotational path of the conveyor instead of the direction parallel to support member. A load cell, whether it is aligned in a direction parallel or non-parallel with the longitudinal axis of the support member, is expressly intended to correspond to the means for sensing a force borne by the support member.

In the alternative, hydraulic ram 22 of FIG. 1A or support members 32 of FIG. 1B and 1C may include a force-detecting device incorporated within a hydraulic or pneumatic piston. Any force detecting device that functions in conjunction with a hydraulic or pneumatic piston is a further example of means for sensing the force borne by the support member.

This embodiment of the weighing system further includes means for measuring the attitude of the conveyor. In the embodiment of the invention illustrated in FIG. 3A, such means includes a clinometer 44 positioned in relation to conveyor 12 so as to detect the pitch angle of the conveyor. Clinometer 44 and other clinometers disclosed herein may be any device for generating an electrical signal in response to the angular position of the device. One example of the many clinometers that may be advantageously used with the invention is clinometer model #AWI1101 manufactured by APTEK Williams, Inc., of Deerfield Beach, Fla. The means for measuring the attitude of the conveyor in the embodiment illustrated in FIG. 3A further includes a clinometer 46 positioned in relation to conveyor 12 so as to detect the roll angle of the conveyor.

Conventional clinometers detect changes in an angular position as the clinometers are caused to rotate about their measurement axis. In FIG. 3A, the measurement axis of clinometer 44 extends out of the page and is parallel to the pivotal axis of conveyor 12 (the axis passing through first end 18 about which the conveyor pivots). Furthermore, the measurement axis of clinometer 46 is shown as being parallel to centerline 48 of conveyor 12. The foregoing alignment of the clinometers is one convenient configuration selected from a great number of possible configurations of the clinometers. It can be understood that the output of two clinometers having any of a large number of measurement axes can be used to specify the attitude of a conveyor, subject to the following limitations. First, the measurement axes of the two clinometers generally should be mutually non-parallel so as not to merely duplicate the measured data. Second, as the direction of a measurement axis of a clinometer approaches verticality, the clinometer begins to provide faulty data.

Accordingly, the weighing systems of the invention may include clinometers 44 and 46 with their measurement axes in substantially any direction, subject to the foregoing limitations. Of course, depending on the configuration of the measurement axes of the clinometers, the output of the clinometers may need to be processed according to the trigonometric methods or otherwise adjusted in order to define the attitude of the conveyor. In summary, any combination of clinometers that provides data that may be used to uniquely define the attitude of the conveyor are suitable examples of the means for measuring the attitude of the conveyor and may be used according to the invention.

The weighing system further includes means for measuring the direction through which the force borne by the support member acts. One example of such means is a clinometer 52 positioned with respect to support member 14 so as to detect the angle of inclination. Clinometer 52 may be similar to clinometers 44 and 46 disclosed herein. Clinometer 52 as depicted in FIG. 3A has a measurement axis parallel to the measurement axis of clinometer 44. However, the measurement axis of clinometer 52 may have any other alignment that permits clinometer 52 to generate data that may be used to uniquely specify the angle of inclination of support member 14. As but one example of the other possible alignments, the measurement axis could be rotated several degrees in any selected direction from the alignment shown in FIG. 3A, while still providing data that may be used to specify the angle of inclination. Again, depending on the alignment of the measurement axis of clinometer 52, the output of the clinometer may need to be adjusted according to trigonometric methods in order to define.

An alternative structure that corresponds to the means for measuring the direction of the force is a length transducer optionally integrated in support member 14. For example, hydraulic ram 22 may include a transducer that provides data that may be used to specify the length of support member 14. The measured length of support member 14 may be combined with fixed dimensions of the conveyor assembly in order to identify the length of the three legs of a triangle (i.e., support member 14, conveyor 12, and the distance between base 17 and base 18). Accordingly, the attitude of conveyor 12 and the measured length of support member 14 may be used to identify the value of.

As mentioned previously, the load cell may be optionally aligned to measure a force that acts in a direction that is not parallel with the longitudinal axis of the support member. In such situations, clinometer 52 may be positioned on the conveyor assembly so as to measure the direction of the force, instead of measuring the angle of inclination of the support member. Furthermore, in some conveyor assemblies, the direction of the force may be dependent on the attitude of conveyor 12 instead of on the angle of inclination of support member 14. In such circumstances, clinometer 52 may be eliminated entirely, since the direction of the measured force may be defined by specifying the attitude of the conveyor using clinometers 44 and 46. In this case, clinometers 44 and 46 may correspond to the means for measuring the direction through which the force acts.

If the weighing system is to be used to provide flow rate measurements in addition to, or in place of, weight measurements, the weighing system further includes means for determining the speed of the conveyor. According to one embodiment of the invention, the means for determining the speed of the conveyor includes a conventional shaft rotation sensor 50 attached to pulley 26 or, in the alternative, to pulley 28 so as to monitor the rate of rotation of the pulley, which is easily translated into the conveyor speed. It may be preferable to attach shaft speed sensor 50 to the non-powered pulley to eliminate error that might otherwise be introduced by drive wheel slippage. Typically, the non-powered pulley is pulley 26.

Figure 4:
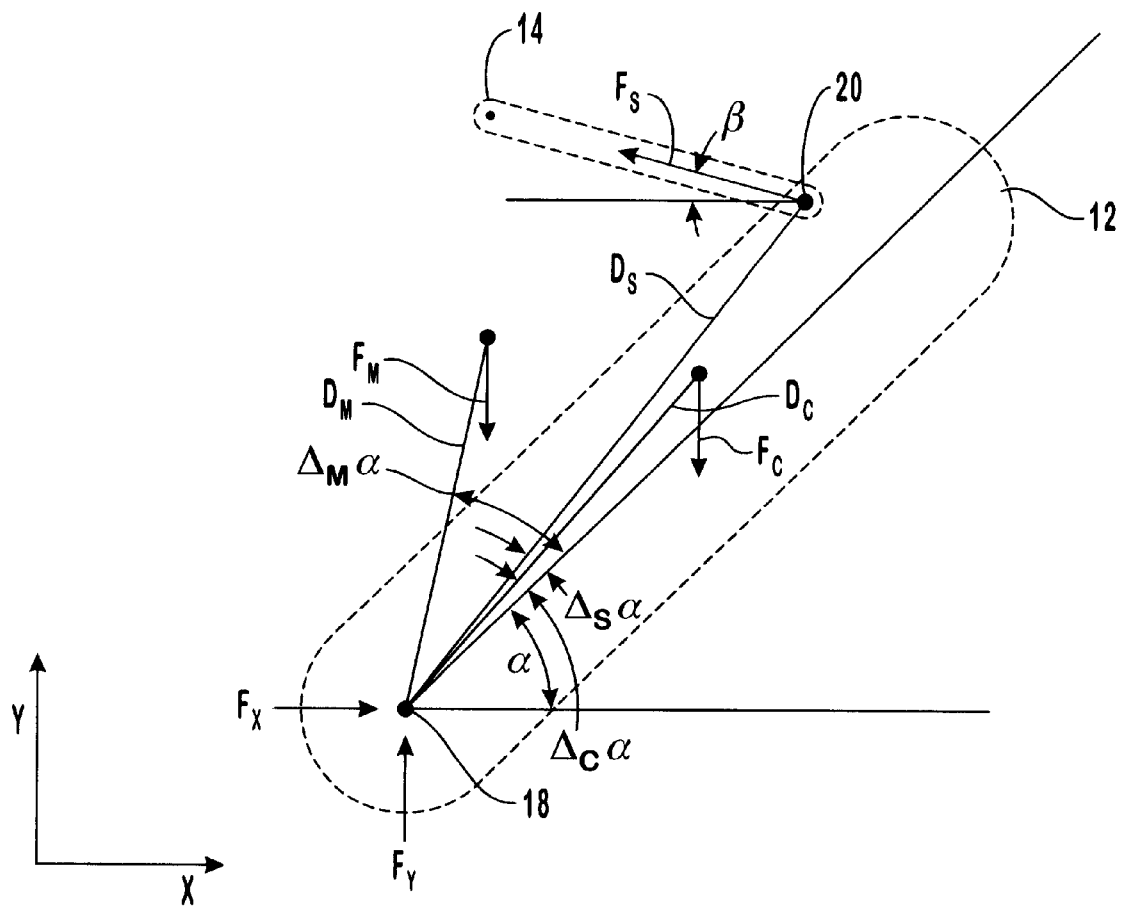
FIG. 4 illustrates selected known and unknown quantities and dimensions that may be used according to one embodiment of the invention for calculating the weight of the material carried on the conveyor.

FIG. 4 illustrates selected dimensions of the conveyor assembly that may be used in one set of equations for calculating the weight of the material on the conveyor. For purposes of clarity, the system illustrated in FIG. 4 is two-dimensional, and depicts the forces and dimensions having been already adjusted for any variations in the roll angle of the conveyor. The unknown quantities in FIG. 4 are the weight of the material, $F_m$, and the forces $F_x$ and $F_y$ that act on the pin at first end 18 of conveyor 12. The three unknown quantities may be determined using three static force equations in the two-dimensional system of FIG. 4: summation of forces in the X direction, summation of forces in the Y direction, and summation of moments about first end 18. In practice, since $F_x$ and $F_y$ act through first end 18, $F_m$ is the only unknown quantity in an equation wherein moments are summed about first end 18. Thus, the summation of moments about first end 18 is sufficient to identify the weight of the material according to this embodiment of the invention.

The values that are used in summing the moments about first end 18 are depicted in FIG. 4 and are described as follows. The measured force, $F_s$, is measured by the load cell and acts through a direction defined by, which is measured according to the methods disclosed herein. The tare weight of the conveyor, $F_c$, is a measured value, and is generally constant throughout the weighing operation. The tare weight $F_c$ may be identified by any desired method, examples of which are disclosed in greater detail below. The distances between first end 18 and the points through which the forces $F_m$, $F_s$, and $F_c$ act are represented by $D_m$, $D_s$, and $D_c$, respectively in FIG. 4. Distances $D_c$ and $D_s$ are predetermined and fixed, while distance $D_m$ is determined by assuming a constant position of the center of mass of the material carried on the conveyor.

As shown in FIG. 4, depending on the configuration of the elements of the conveyor assembly, the angular positions of $D_m$, $D_s$, and $D_c$, may be offset by a fixed amount from the pitch angle,, which may be measured according to the methods disclosed herein. For example, the assumed center of mass of the material on the conveyor may displaced from through a small offset angle with respect to first end 18. This offset angle of the center of mass of the material is shown at m. Likewise, there may be offset angles $_s$ and $_c$ that correspond to forces $F_s$ and $F_c$, respectively.

In light of the disclosure made herein, those skilled in the art will understand the computational methods used for calculating the weight of material 36 using the data generated by load cell 42 and clinometers 44, 46, and 52. Trigonometric methods may be used to resolve the forces and dimensions into directional components that may be conveniently used in the static force equations and algorithms. The specific equations, algorithms, and measured and fixed values depend, of course, on the specific configuration of the conveyor assembly with which the weighing system is used.

The weighing system has been described in reference to FIGS. 3A and 3B, which depict a conveyor assembly mounted on harvesting equipment or another supporting structure such that the conveyor has a variable pitch angle and a variable roll angle and the support member has a variable angle. Accordingly, the angular position of the elements of the conveyor/support member assembly has three independent variables. The invention extends, however, to conveyor assemblies having fewer variable angular measurements. For example, some conveyor assemblies may have a fixed roll angle and a variable pitch angle. Consequently, clinometer 44 may be used without clinometer 46 to measure the attitude of the conveyor, in which case, the means for measuring the attitude of the conveyor could include only one clinometer.

In view of the foregoing, it is to be understood that the invention extends to weighing systems for use with conveyor assemblies having any combination of variable or fixed pitch angles, roll angles, and angles of inclination of the support members. Moreover, the weighing systems may be used with any such conveyor assembly, whether or not the angular positions of the elements of the conveyor assembly are actually being adjusted.

Figure 5:
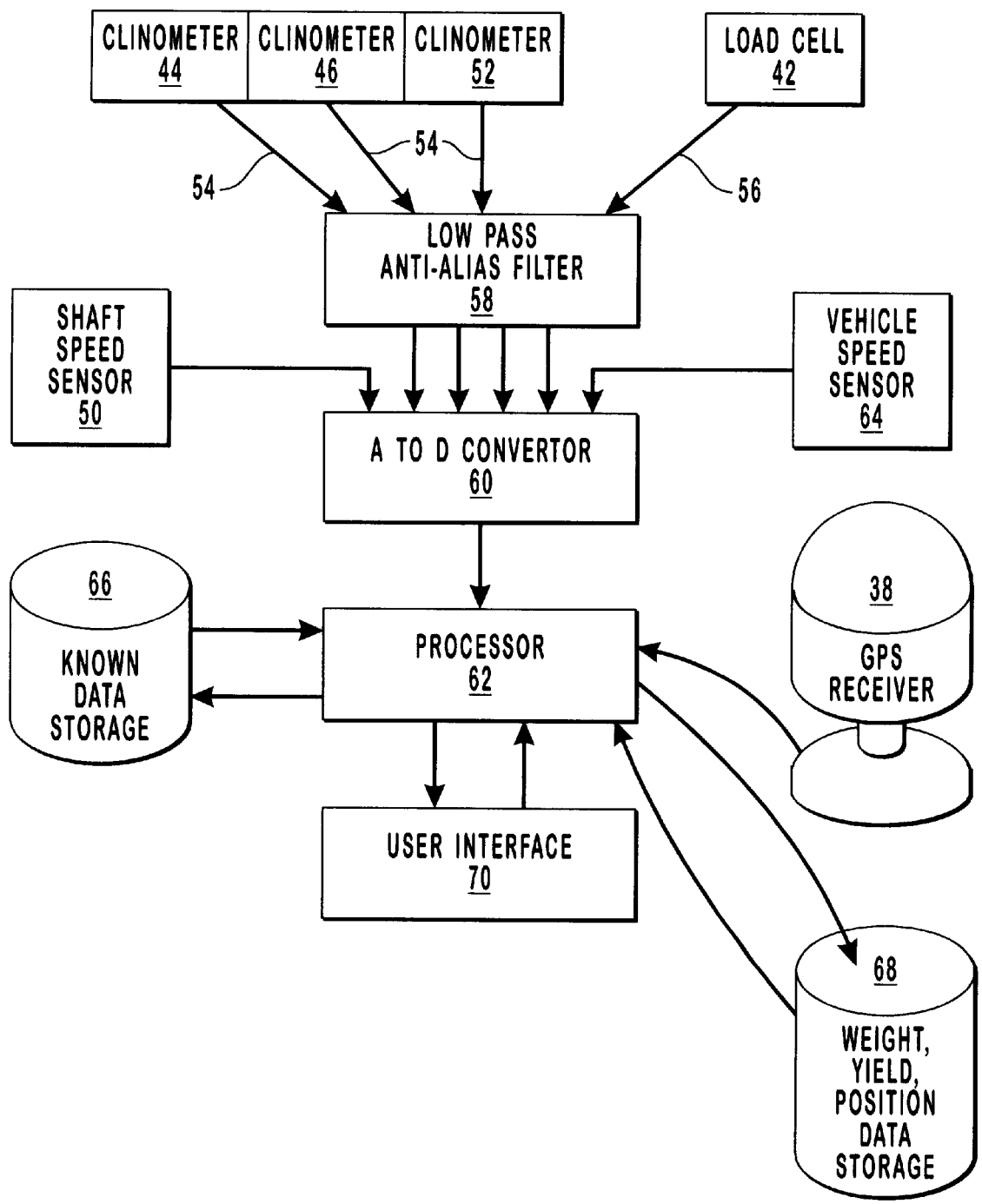
FIG. 5 is a block diagram illustrating one example of the operation of the weighing systems of the invention.

FIG. 5 is a schematic diagram illustrating the flow and processing of information in a representative embodiment of a weighing system for use with a conveyor assembly mounted on a vehicle. Clinometers 44, 46, and 52 generate analog electrical signals 54 corresponding to the angular position of the elements of the conveyor assembly according to the methods disclosed herein. Load cell 42 also generates data in the form of an analog electrical signal 56 representing the force borne by the support member. In some environments in which the weighing systems of the invention are used, the weighing systems experience vibration, with the result that the signals 54 and 56 include noise. Much of the noise can be reduced by passing signals 54 and 56 through a conventional low pass anti-aliasing filter 58.

The filtered signals are sent to an analog-to-digital converter 60 to generate digital signals compatible with digital processor 62. If the weighing system is to be used to calculate the flow rate of the material on the conveyor, shaft speed sensor 50 transmits signals to analog-to-digital converter 60. Furthermore, if the weighing system is used, for example, with harvesting equipment 34 of FIG. 2, a vehicle speed sensor 64 is optionally included to generate signals for monitoring the motion of the harvesting equipment across a field.

The measured data is transmitted to processor 62, which may be any suitable digital processing device having circuitry and/or executable code for executing the algorithms used to determine the weight of the material from the measured and known data. By way of example, one suitable processor 62 is model #HM-500 manufactured by HarvestMaster, Inc., of Logan, Utah. Thus, processor 62 is but one example of digital processor means for calculating the weight of the material using data representing the measured force, the measured direction of the force, and the measured attitude of the conveyor.

Known data storage 66 stores fixed, known, or already-measured data that is used by processor 62 in calculating the weight of the material, the flow rate of the material, the yield distribution of crops, or the like. Known data storage 66 may be any suitable device for storing computer-readable data, and may be integrated with processor 62. Examples of the data that may be contained in known data storage 66 include the pre-determined or fixed values described above in reference to FIG. 4 and any other desired fixed dimension or physical property of the elements of the conveyor assembly.

Processor 62 may be used to calculate any desired metric, such as the weight, flow rate, crop yield, yield distribution, etc., of the material disposed on the conveyor assembly. In one embodiment of the invention, the weight of the material is calculated by taking a running average of a set of discrete samples over a period of time. By way of example, and not by limitation, the low pass filter 58 may have a threshold value of about 3 Hz, the signals may be sampled by the processor at a rate of 6 Hz or greater, and the running average may be calculated over a period of about 2 seconds. Of course, the desired filter, sample rate, and running average period may be highly dependent upon the particular application with which the weighing system is used.

In general, the algorithms executed in processor 62 for calculating the weight of the material, the flow rate, and the like, depend directly or indirectly on a measured value for the weight of the conveyor. Accordingly, a value of the tare weight of the conveyor is contained in known data storage 66 and is sent to processor 62 when needed. The tare weight may be obtained by any desired method. Typically, the tare weight is identified by conducting a weighing operation according to the methods disclosed herein in the absence of material on the conveyor. The tare weight of the conveyor is then stored in known data storage 66 so as to be available during subsequent weighing operations of material positioned on the conveyor.

The weighing system and processor 62 can be used to calculate the flow rate of the material on the conveyor by identifying the running average of the weight of the material, the conveyor speed from shaft speed sensor 50, and a fixed residency length of the material on the conveyor. The residency length of the material is the distance through which the material is carried while on the conveyor.

When the weighing system is used with harvesting equipment, the yield, the yield distribution, and the total weight of the harvested crops may be calculated as desired. The yield of harvested crops is conventionally expressed in unit weight per unit area. The weight may be calculated according to the methods disclosed herein. The area from which the crops are harvested may be identified, for example, by combining the output of a vehicle speed sensor 64 with a fixed or variable width, W, of the swath from which harvesting equipment 34 harvests crops as shown in FIG. 2.

The yield distribution of the crops over the harvested field may calculated by combining the yield data with information generated by positional locating means for detecting the position of the weighing system and the associated equipment on the field or tract of land. One example of such positional locating means is a global positioning system (GPS) receiver 38 as shown in FIG. 2. The function of a global positioning system for determining the position of a moving object is well known by those skilled in the art. In the alternative, any other conventional device or system for specifying the variable position of a moving object may constitute the positional locating means. The positional data of GPS receiver 38 may be passed to processor 62 and correlated with the calculated yield data, in order to identify crop yields associated with specific regions of the field.

The process of calculating the weight of the material on the conveyor and/or identifying any of the other desired measurements may be repeatedly conducted over time as the weight of the material and the angular position of the conveyor assembly change. It is noted that the weighing system either implicitly or explicitly calculates a weight of the material in the process of calculating the other measurements such as flow rate, yield, yield distribution, etc. Thus, regardless of the particular property of the material identified using systems of the invention, processor 62 is an example of digital processor means for calculating the weight of the material.

As the processor calculates each value of the weight of the material, the yield of the crops, the position of the conveyor assembly, etc., the calculated value may then be directed to data storage 68, which is any suitable device for storing computer-generated data Furthermore, data storage 68 may be a memory device integrated with processor 62. During the processes of calculating the desired measurement and displaying the measured values to a user, the information stored in data storage 68 may be retrieved as desired.

The weighing system preferably includes a user interface 70 that displays the weight or other values calculated by processor 62 and/or allows the user to select sensor settings or access weighing system diagnostics. For example, user interface 70 may include an operator console, a computer display screen or another graphical display unit for displaying instantaneous or average material weight measurements or crop yields. When the weighing system is used in a harvesting operation, user interface 70 may display a running total of the weight of the crops harvested or conveyed to truck 72 illustrated in FIG. 2.

In one embodiment of the invention, the weighing system is used to generate a map of the yield and the distribution of the yield over a harvested field. For example, the processor 62 associates the yield data with the positional data gathered by global positioning system receiver 38. The yield data and the positional data may be displayed to the user through the user interface 70 by means of a computer display screen. Alternatively, a printed copy of the map may be produced by user interface 70. Thus, the combination of processor 62 and user interface 70 is one example of mapping means for visually representing the crop yield with respect to the location on the field from which the crops have been harvested.

The manner in which the data is processed and displayed to the user is not limited to the examples described herein. The data may be displayed to the user in any other form, and the weight data may be processed as desired. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for measuring the weight of a material during a process of conveying said material, said system comprising:
   a conveyor assembly including:
      a conveyor having an attitude defined by a pitch angle and a roll angle, wherein at least one of said pitch angle and said roll angle is variable; and
      a support member pivotally connected to said conveyor;
   means for sensing a force borne by said support member;
   means for measuring a direction through which said force acts;
   means for measuring said attitude of said conveyor; and
   a processor for calculating the weight of said material using data representing said force, said direction through which said force acts, and said attitude of said conveyor.

2. A system as defined in claim 1, wherein said means for sensing said force comprises a load cell integrally positioned in said support member.

3. A system as defined in claim 1, wherein said means for sensing said force comprises only one load cell.

4. A system as defined in claim 1, wherein said means for sensing said force comprises a load cell in contact with one end of said support member.

5. A system as defined in claim 1, wherein said means for measuring said direction comprises a clinometer positioned in relation to said support member so as to detect an angle of inclination of said support member.

6. A system as defined in claim 1, wherein said pitch angle is variable and said roll angle is substantially fixed, said means for measuring said attitude of said conveyor comprising a clinometer positioned in relation to said conveyor so as to detect said pitch angle.

7. A system as defined in claim 1, wherein each of said pitch angle and said roll angle are variable, said means for measuring said attitude of said conveyor comprising a first clinometer and a second clinometer positioned in relation to said conveyor so as to detect said pitch angle and said roll angle.

8. A system as defined in claim 1, wherein said conveyor assembly is supported by a supporting structure such that said pitch angle and said roll angle are variable and said support member has an angle of inclination with respect to the horizontal plane that is at least partially independent of said pitch angle, and wherein:
   said means for measuring said attitude of said conveyor comprises a first clinometer and a second clinometer positioned in relation to said conveyor so as to detect said pitch angle and said roll angle; and
   said means for measuring said direction comprises a third clinometer positioned in relation to said support member so as to detect said angle of inclination.

9. A system as defined in claim 1, wherein said material comprises crops and wherein said system further comprises harvesting means for gathering said crops and disposing said crops on said conveyor.

10. A system as defined in claim 9, wherein said support member has a length that can be adjusted.

11. A system as defined in claim 10, wherein said support member and said conveyor are in a mechanical relationship such that adjustment of the length of said support member varies said pitch angle of said conveyor.

12. A system as defined in claim 1, further comprising positional locating means for detecting a position of said system on a tract of land.

13. A system as defined in claim 11, wherein said positional locating means comprises a global positioning system receiver.

14. A system as defined in claim 1, further comprising means for determining a speed of said conveyor.

15. A system as defined in claim 1, wherein said support member supports said conveyor rather than supporting only a portion of a belt of said conveyor.

16. A system for measuring the weight of a material during a process of conveying said material, said system comprising:
- a conveyor assembly including:
  - a conveyor having an attitude defined by a pitch angle and a roll angle, wherein at least one of said pitch angle and said roll angle is variable; and
  - a support member connected to said conveyor and supporting said conveyor rather than supporting only a portion of a belt of said conveyor;
- means for sensing a force borne by said support member;
- means for measuring a direction through which said force acts;
- means for measuring said attitude of said conveyor; and
- a processor for calculating the weight of said material using data representing said force, said direction through which said force acts, and said attitude of said conveyor.

17. In a system for carrying a material on a conveyor assembly, wherein said conveyor assembly includes a conveyor having a variable attitude defined by a pitch angle and a roll angle, and wherein said conveyor assembly further includes a support member connected to said conveyor, a method for measuring the weight of said material, comprising the steps of:
- adjusting a length of said support member, such that said pitch angle of said conveyor is varied;
- disposing said material on said conveyor assembly;
- measuring a force borne by said support member;
- measuring a direction through which said force acts;
- measuring said variable attitude of said conveyor assembly; and
- calculating said weight of said material using at least said measured force, said measured direction, and said measured variable attitude.

18. A method as defined in claim 17, wherein said step of measuring said force comprises using only one load cell.

19. A method as defined in claim 17, wherein said pitch angle and said roll angle are each variable, and wherein said step of measuring said variable attitude comprises using a first clinometer and a second clinometer to detect said attitude.

20. A method as defined in claim 17, wherein each of the steps of measuring said force, measuring said direction through which said force acts, and measuring said variable attitude comprises passing at least one signal through a low pass, anti-aliasing filter.

21. A method as defined in claim 17, wherein said step of measuring said direction comprises using a clinometer positioned in relation to said support member so as to detect an angle of inclination of said support member with respect to the horizontal plane.

22. A method as defined in claim 17, further comprising the step of calculating a flow rate of said material after said step of calculating said weight.

23. A method as defined in claim 17, wherein said material is crops and wherein said method further comprises an ongoing step of harvesting said crops, said pitch angle and said roll angle each varying during said step of harvesting said crops.

24. A method as defined in claim 23, wherein said step of calculating said weight is repeatedly conducted during said step of harvesting said crops.

25. A method as defined in claim 23, further comprising the step of repeatedly determining a variable position of said system on a field.

26. A method as defined in claim 25, further comprising the step of storing data representing said weight of said crops and said variable position of said system.

27. A method as defined in claim 26, further comprising the steps of:
- measuring a rate at which said conveyor assembly is carried over said field;
- measuring a conveyor speed; and
- determining a width of a swath across said field from which said crops are harvested.

28. In a system for harvesting crops and conveying said crops using a harvesting vehicle equipped with a conveyor assembly, wherein said conveyor assembly includes a conveyor having a variable attitude, and wherein said conveyor assembly further includes a support member connected to said conveyor, a method for mapping a yield distribution of said crops over a field, comprising the steps of:
- causing said harvesting vehicle to traverse said field such that said crops are harvested and disposed on said conveyor; and
- repeating, as said harvesting vehicle traverses said field, the steps of:
  - measuring a force borne by said support member;
  - measuring a direction through which said force acts;
  - measuring a variable attitude of said conveyor assembly using at least two clinometers, said variable attitude being defined by a variable pitch angle and a variable roll angle;
  - calculating said weight of said crops using at least said measured force, said measured direction, and said measured variable attitude;
  - detecting a position of said harvesting vehicle on said field; and correlating said calculated weight with said detected variable position.

* * * * *

UNITED STATES PATENT AND TRADEMARK OFFICE
CERTIFICATE OF CORRECTION

PATENT : 6,066,809                                                   Page 1 of 2

DATED : May 23, 2000

INVENTOR(S) : Ronald H. Campbell, Paul W. Dow, Allen E. Russell

It is certified that error appears in the above-identified patent and that said Letters Patent is hereby corrected as shown below:

Col. 5, ln 17: after "of" and before "the" delete [a]

Col. 9, ln. 41: after "inclination" insert --$\beta$--

Col. 9, ln. 47: after "inclination" insert --$\beta$--

Col. 9, ln. 55: after "define" insert --$\beta$--

Col. 9, ln. 67: after "value of" insert --$\beta$--

Col. 10, ln. 10: after "inclination" insert --$\beta$--

Col. 10, ln. 51: after "defined by" insert --$\beta$--

UNITED STATES PATENT AND TRADEMARK OFFICE
CERTIFICATE OF CORRECTION

PATENT : 6,066,809
DATED : May 23, 2000
INVENTOR(S): Ronald H. Campbell, Paul W. Dow, Allen E. Russell It is certified that error appears in the above-identified patent and that said Letters Patent is hereby corrected as shown below:

Col. 10, ln. 66: after "angle," insert --$\alpha$--

Col. 11, ln. 1: after "may" and before "displaces" insert --be--

Col. 11, ln. 2: before "through" insert --$\alpha$--

Col. 11, ln. 4: before "Likewise" change "m." to --$\Delta_m\alpha$.--

Col. 11, ln. 4: after "offset angles" change "$_s$" to --$\Delta_s\alpha$--

Col. 11, ln. 4: after "and" change "$_c$" to --$\Delta_c\alpha$--

Col. 12, ln. 65: after "may" and before "calculated" insert --be--

Signed and Sealed this

Twenty-fourth Day of April, 2001

Attest:

NICHOLAS P. GODICI

Attesting Officer    Acting Director of the United States Patent and Trademark Office